US012617378B2

(12) United States Patent
Georgin et al.

(10) Patent No.: US 12,617,378 B2
(45) Date of Patent: May 5, 2026

(54) SELECTIVE ELECTROMECHANICAL BRAKE ACTUATOR BRAKING FOR POWER CONSUMPTION REDUCTION

(71) Applicant: GOODRICH CORPORATION, Charlotte, NC (US)

(72) Inventors: Marc J Georgin, Oakwood, OH (US); Michael J Kordik, Oakwood, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 42 days.

(21) Appl. No.: 18/743,959

(22) Filed: Jun. 14, 2024

(65) Prior Publication Data

US 2025/0381939 A1 Dec. 18, 2025

(51) Int. Cl.
| | |
|---|---|
| B60T 8/172 | (2006.01) |
| B60T 8/17 | (2006.01) |
| B60T 8/171 | (2006.01) |
| B60T 8/58 | (2006.01) |
| B60T 13/74 | (2006.01) |

(52) U.S. Cl.
CPC ............ B60T 8/172 (2013.01); B60T 8/1703 (2013.01); B60T 8/171 (2013.01); B60T 8/58 (2013.01); B60T 13/746 (2013.01)

(58) Field of Classification Search
CPC .................................. B60T 8/1703; B60T 8/58
See application file for complete search history.

(56) References Cited

U.S. PATENT DOCUMENTS

| | | | |
|---|---|---|---|
| 8,948,994 B2 * | 2/2015 | Frank .................... | B60T 8/1703 |
| | | | 244/110 A |
| 2003/0010583 A1 * | 1/2003 | Arnold .................... | B60T 8/345 |
| | | | 188/106 R |
| 2008/0154443 A1 | 6/2008 | Godo | |
| 2011/0155521 A1 * | 6/2011 | Thibault .............. | B60T 8/1703 |
| | | | 188/106 P |
| 2011/0226569 A1 * | 9/2011 | Devlieg ................ | B60T 8/1703 |
| | | | 188/158 |
| 2014/0100719 A1 * | 4/2014 | Thibault .............. | B60T 8/1703 |
| | | | 701/3 |
| 2014/0116814 A1 * | 5/2014 | Laur .................... | B60T 13/741 |
| | | | 188/72.1 |
| 2015/0217748 A1 * | 8/2015 | Chico ................... | B60T 8/1703 |
| | | | 701/3 |
| 2016/0031553 A1 | 2/2016 | DiZazzo et al. | |
| 2023/0382520 A1 | 11/2023 | Ferrier et al. | |

* cited by examiner

*Primary Examiner* — Long T Tran
(74) *Attorney, Agent, or Firm* — SNELL & WILMER L.L.P.

(57) ABSTRACT

An electromechanical brake system is disclosed herein. The electromechanical brake system includes at least two electromechanical brake actuators and an electronic brake actuator controller. The electronic brake actuator controller is coupled to the at least two electromechanical brake actuators. Responsive to receiving a requested braking force, the electronic brake actuator controller is configured to: determine whether the requested braking force is above a predetermined percentage of a total amount of braking available; and, responsive to the requested braking force being at or below the predetermined percentage of the total amount of braking available, selectively control one electromechanical brake actuator of the at least two electromechanical brake actuators and selectively control an amount of braking force applied by the one electromechanical brake actuator.

20 Claims, 4 Drawing Sheets

400

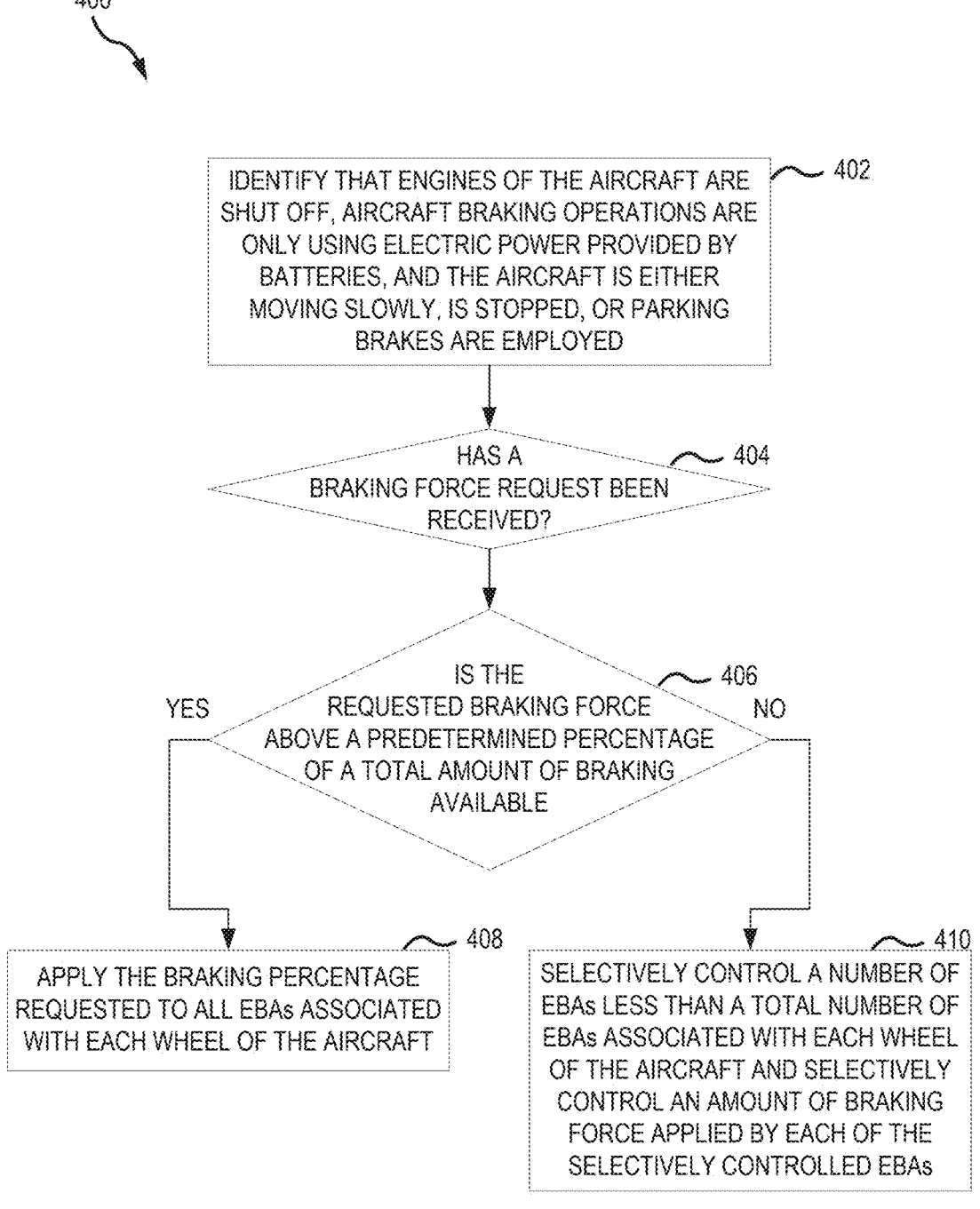

402

IDENTIFY THAT ENGINES OF THE AIRCRAFT ARE SHUT OFF, AIRCRAFT BRAKING OPERATIONS ARE ONLY USING ELECTRIC POWER PROVIDED BY BATTERIES, AND THE AIRCRAFT IS EITHER MOVING SLOWLY, IS STOPPED, OR PARKING BRAKES ARE EMPLOYED

404

HAS A BRAKING FORCE REQUEST BEEN RECEIVED?

406

IS THE REQUESTED BRAKING FORCE ABOVE A PREDETERMINED PERCENTAGE OF A TOTAL AMOUNT OF BRAKING AVAILABLE

YES NO

408

APPLY THE BRAKING PERCENTAGE REQUESTED TO ALL EBAs ASSOCIATED WITH EACH WHEEL OF THE AIRCRAFT

410

SELECTIVELY CONTROL A NUMBER OF EBAs LESS THAN A TOTAL NUMBER OF EBAs ASSOCIATED WITH EACH WHEEL OF THE AIRCRAFT AND SELECTIVELY CONTROL AN AMOUNT OF BRAKING FORCE APPLIED BY EACH OF THE SELECTIVELY CONTROLLED EBAs

FIG.4

SELECTIVE ELECTROMECHANICAL BRAKE ACTUATOR BRAKING FOR POWER CONSUMPTION REDUCTION

FIELD

The present disclosure relates to aircraft braking systems, and more specifically, to selective electromechanical brake actuator braking for power consumption reduction.

BACKGROUND

Typically, an aircraft may comprise an electromechanical brake (E-brake) system that utilizes a plurality of electromechanical brake actuators (EBAs) configured to apply force to a brake stack on an aircraft wheel. As aircrafts are converted to utilize more electricity and thus utilize such E-brake systems, there is a need to conserve electric power during various ground operations, such as, for example, towing, especially when the electric brake system operates only electric power provided by batteries, i.e. the engines are shut off.

SUMMARY

An electromechanical brake system is disclosed herein. The electromechanical brake system includes at least two electromechanical brake actuators and an electronic brake actuator controller. The electronic brake actuator controller is coupled to the at least two electromechanical brake actuators. Responsive to receiving a requested braking force, the electronic brake actuator controller is configured to determine whether the requested braking force is above a predetermined percentage of a total amount of braking available; and, responsive to the requested braking force being at or below the predetermined percentage of the total amount of braking available: selectively control one electromechanical brake actuator of the at least two electromechanical brake actuators while the other electromechanical brake actuator of the at least two electromechanical brake actuators remain unactuated and selectively control an amount of braking force applied by the one electromechanical brake actuator.

In various embodiments, the electronic brake actuator controller is further configured to, responsive to the requested braking force being above the predetermined percentage of the total amount of braking available, control the at least two electromechanical brake actuators to each apply the requested braking force.

In various embodiments, the amount of braking force applied by the one electromechanical brake actuator is greater than the requested braking force.

In various embodiments, the amount of braking force applied by the one electromechanical brake actuator is between 10 percent and 100 percent more than the requested braking force.

In various embodiments, the at least two electromechanical brake actuators are at least four electromechanical brake actuators spaced equidistance around a wheel, wherein the electronic brake actuator controller is configured to, responsive to the requested braking force being at or below the predetermined percentage of the total amount of braking available, selectively control two or more electromechanical brake actuators of the at least four electromechanical brake actuators, wherein at least two of the two or more electromechanical brake actuators are opposite one another.

In various embodiments, the at least two electromechanical brake actuators are at least four electromechanical brake actuators spaced equidistance around a wheel, wherein the electronic brake actuator controller is configured to, responsive to the requested braking force being at or below the predetermined percentage of the total amount of braking available, selectively control two or more electromechanical brake actuators of the at least four electromechanical brake actuators, wherein at least two of the two or more electromechanical brake actuators are adjacent to one another.

In various embodiments, the electronic brake actuator controller is configured to selectively control one electromechanical brake actuator of the at least two electromechanical brake actuators and selectively control the amount of braking force applied by the one electromechanical brake actuator in response to engines of an aircraft in which the electromechanical brake system is installed are shut off, aircraft braking operations are provided by batteries, and the aircraft is either moving slowly or is stopped.

In various embodiments, the electronic brake actuator controller is configured to selectively control one electromechanical brake actuator of the at least two electromechanical brake actuators and selectively control the amount of braking force applied by the one electromechanical brake actuator in response to engines of an aircraft in which the electromechanical brake system is installed are shut off, aircraft braking operations are provided by batteries, and a parking brake of the aircraft is employed.

Also disclosed herein is an aircraft. The aircraft includes an electromechanical brake system. The electromechanical brake system includes at least two electromechanical brake actuators and an electronic brake actuator controller. The electronic brake actuator controller is coupled to the at least two electromechanical brake actuators. Responsive to receiving a requested braking force, the electronic brake actuator controller is configured to determine whether the requested braking force is above a predetermined percentage of a total amount of braking available; and, responsive to the requested braking force being at or below the predetermined percentage of the total amount of braking available: selectively control one electromechanical brake actuator of the at least two electromechanical brake actuators while the other electromechanical brake actuator of the at least two electromechanical brake actuators remain unactuated and selectively control an amount of braking force applied by the one electromechanical brake actuator.

In various embodiments, the electronic brake actuator controller is further configured to, responsive to the requested braking force being above the predetermined percentage of the total amount of braking available, control the at least two electromechanical brake actuators to each apply the requested braking force.

In various embodiments, the amount of braking force applied by the one electromechanical brake actuator is greater than the requested braking force.

In various embodiments, the amount of braking force applied by the one electromechanical brake actuator is between 10 percent and 100 percent more than the requested braking force.

In various embodiments, the at least two electromechanical brake actuators are at least four electromechanical brake actuators spaced equidistance around a wheel, wherein the electronic brake actuator controller is configured to, responsive to the requested braking force being at or below the predetermined percentage of the total amount of braking available, selectively control two or more electromechanical brake actuators of the at least four electromechanical brake actuators, wherein at least two of the two or more electromechanical brake actuators are opposite one another.

In various embodiments, the at least two electromechanical brake actuators are at least four electromechanical brake actuators spaced equidistance around a wheel, wherein the electronic brake actuator controller is configured to, responsive to the requested braking force being at or below the predetermined percentage of the total amount of braking available, selectively control two or more electromechanical brake actuators of the at least four electromechanical brake actuators, wherein at least two of the two or more electromechanical brake actuators are adjacent to one another.

In various embodiments, the electronic brake actuator controller is configured to selectively control one electromechanical brake actuator of the at least two electromechanical brake actuators and selectively control the amount of braking force applied by the one electromechanical brake actuator in response to engines of an aircraft in which the electromechanical brake system is installed are shut off, aircraft braking operations are provided by batteries, and the aircraft is either moving slowly or is stopped.

In various embodiments, the electronic brake actuator controller is configured to selectively control one electromechanical brake actuator of the at least two electromechanical brake actuators and selectively control the amount of braking force applied by the one electromechanical brake actuator in response to engines of an aircraft in which the electromechanical brake system is installed are shut off, aircraft braking operations are provided by batteries, and a parking brake of the aircraft is employed.

Also disclosed herein is a method of controlling at least two electromechanical brake actuators of a brake assembly. The method includes, responsive to receiving a request to apply a requested braking force to the brake assembly, determining, by an electronic brake actuator controller, whether the requested braking force is above a predetermined percentage of a total amount of braking available and, responsive to the requested braking force being at or below the predetermined percentage of the total amount of braking available, selectively controlling, by the electronic brake actuator controller, one electromechanical brake actuator of the at least two electromechanical brake actuators while the other electromechanical brake actuator of the at least two electromechanical brake actuators remain unactuated and selectively controlling, by the electronic brake actuator controller, an amount of braking force applied by the one electromechanical brake actuator.

In various embodiments, the method further includes, responsive to the requested braking force being above the predetermined percentage of the total amount of braking available, controlling, by the electronic brake actuator controller, the at least two electromechanical brake actuators to each apply the requested braking force.

In various embodiments, the amount of braking force applied by the one electromechanical brake actuator is greater than the requested braking force.

In various embodiments, the amount of braking force applied by the one electromechanical brake actuator is between 10 percent and 100 percent more than the requested braking force.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 4 illustrates a method for selective braking of electromechanical brake actuators (EBAs) within an electromechanical brake (E-brake) system, in accordance with various embodiments.

DETAILED DESCRIPTION

Figure 1:
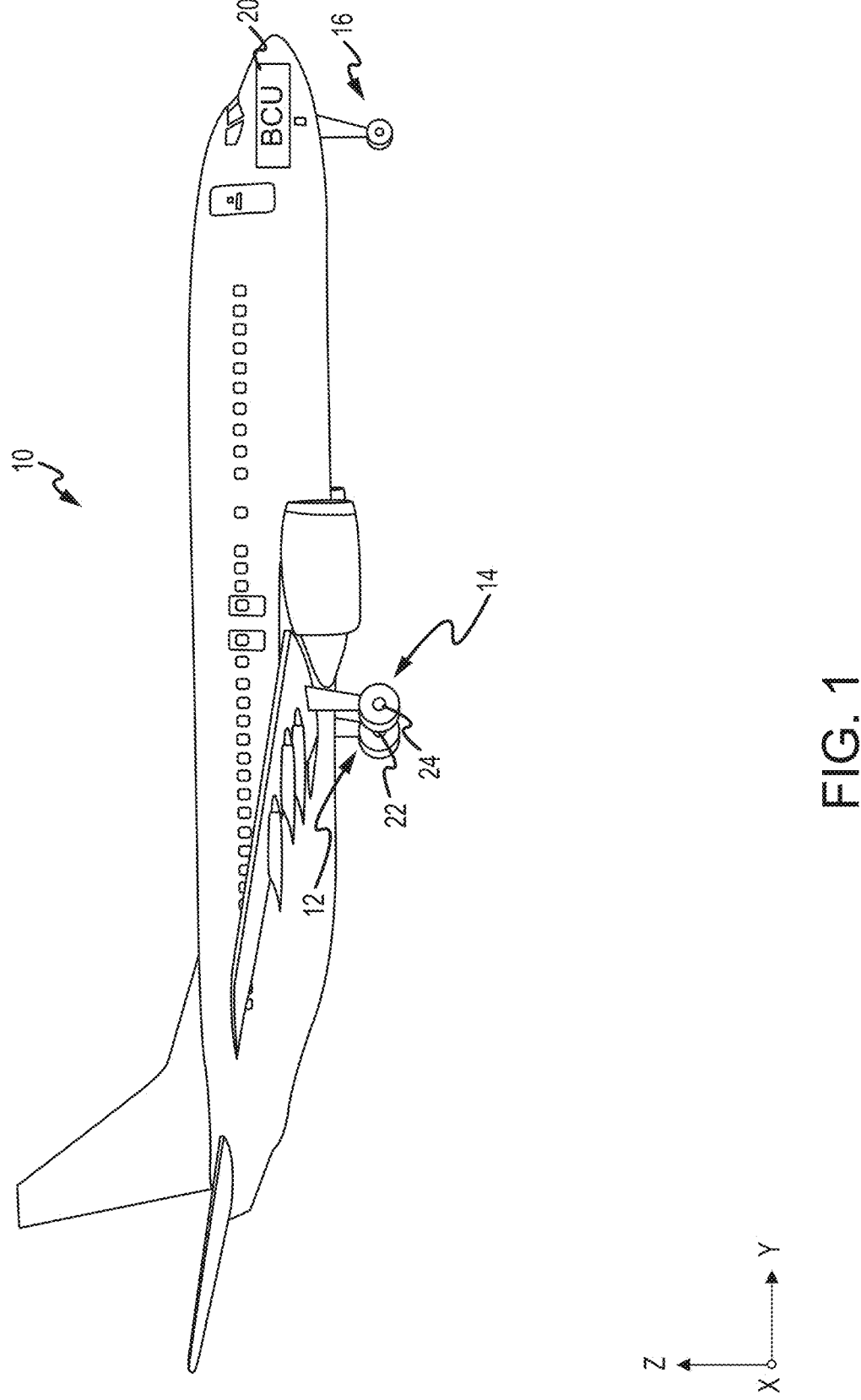
FIG. 1 illustrates an aircraft having multiple landing gear and brakes, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). While described in the context of aircraft applications, and more specifically, in the context of brake control, the various embodiments of the present disclosure may be applied to any suitable application.

As stated previously, as aircrafts are converted to utilize more electricity and thus, utilize such electromechanical brake (E-brake) systems and use a plurality of electromechanical brake actuators (EBAs) configured to apply force to a brake stack on an aircraft wheel, electric power needs to be conserved during various ground operations when the E-brake system operates only electric power provided by batteries.

Disclosed herein is an electromechanical brake (E-brake) system that utilizes selective braking of EBAs within the E-brake system. In various embodiments, the selective use of EBAs provides improved electric power management, especially responsive to the E-brake system operating only electric power provided by batteries when the engines are shut off. Additionally, in various embodiments, by selectively using EBAs, endurance cycles of the EBAs may be reduced therefore improving EBA reliability. In various embodiments, during ground operations, where the engines are shut off, aircraft braking operations are electric power provided by batteries, and the aircraft is either moving slowly, i.e. below a predetermined speed, for example 10 knots, or the aircraft is stopped and parking brakes are employed, braking force levels requested by a pilot or maintenance operator, among others, are low, in a range of a total capacity of the brake system less than or equal to a predetermined percentage of the total capacity. In various embodiments, the range of total capacity may be less than or equal to 30%. In various embodiments, the range of total capacity may be between greater than 5% and less than or equal to 30%.

In various embodiments, responsive to the requested braking force level being less than or equal to a predetermined percentage of the total capacity, a number of EBAs actuated to execute the braking event is less than a total number of EBAs associated with each wheel of the aircraft but the amount of force applied by the selected EBAs is increased to meet the requested braking force level. In that regard, in various embodiments, in case of a 4-wheel aircraft, a number of EBAs actuated to execute the braking event may be one EBA per wheel. In various embodiments, in the case of a 4-wheel aircraft, a number of EBAs actuated to execute the braking event may be two EBAs per wheel. In various embodiments, in the case of a 4-wheel aircraft, a number of EBAs actuated to execute the braking event may be three EBAs per wheel. In various embodiments, when two EBAs are actuated, the EBAs actuated may be opposite each other. In various embodiments, when two EBAs are actuated, the EBAs actuated may be adjacent to one another. In various embodiments, in the case of a 4-wheel aircraft, an electronic brake actuator controller (EBAC), under the command of a brake control unit, may select 1, 2, or 3 of the EBAs during a first braking event and, during a subsequent braking event, select a different set of 1, 2, or 3 EBAs in order to improve EBA reliability. Therefore, as an example, in the case of a 4-wheel aircraft, during a first braking event, the EBAC may select an "A" EBA and a "C" EBA that opposite one another and, during a subsequent braking event, select a "B" EBA and a "D" EBA that are opposite one another to improve EBA reliability. Accordingly, in various embodiments, a net effect is that the EBA's are only actuated in half the total number of braking events and/or actuations, increasing their reliability. In various embodiments, a braking event may be considered as a landing or rejected takeoff, among others. In various embodiments, during each braking event, EBAs may be actuated many times, for example, during anti-skid control. In that regards, in various embodiment, during one braking event, EBAs may be commanded to actuate and cease (or even retract) several times depending upon control signals (pilot input) and/or under anti-skid control and/or deceleration based braking control. In various embodiments, although the following is described with regard to a braking event, EBA may alternate per actuation or per braking event. Accordingly, in various embodiments, half the time indicates a total number of braking events/2 or total number of actuations/2.

In various embodiments, responsive to a pilot or a maintenance operator or other brake control unit command requesting 20% braking force, the brake control unit may determine that the full 20% braking force is not needed due to the current speed of the aircraft or historical braking operations, among other considerations. In that regard, in an event where the engines are shut off, aircraft braking operations are electric power provided by batteries, the aircraft is moving slowly or is stopped, and the pilot or maintenance operator requests 20% braking force, the brake control unit may send a command to an electronic brake actuator controller (EBAC) that causes the EBAC to initially apply a predetermined percentage of the requested braking force, which provides additional control of the brakes at the lower levels of brake application and decreases the electrical power needed to be drawn from the batteries.

In various embodiments, in an event where the engines are shut off, aircraft braking operations are electric power provided by batteries, the aircraft is moving slowly or is stopped, and the pilot or maintenance operator requests 20% braking force, since the number of EBAs actuated to execute the braking event is less than a total number of EBAs associated with each wheel of the aircraft, the EBAC, under command of a brake control unit, may increase a braking force applied by the selected EBAs in order to quantitatively meet the 20% braking force that would typically be applied by all of the EBAs. In that regard, where typically, in a four EBA per wheel system, 20% braking force would be applied by each of the EBAs, in various embodiments, when only two EBAs per wheel are utilized, the EBAC may increase the braking force applied by each of the two EBAs per wheel above the requested 20% braking force. In various embodiments, the increase may be between 10% and 100%. In various embodiments, the increase may be between 25% and 100%. In various embodiments, the increase may be between 50% and 100%. In various embodiments, the increase may be between 75% and 100%. Accordingly, in various embodiments, the EBAs are utilized less thereby providing better reliability and power may be reduced unless the braking force is increased by 100%.

In various embodiments, the number of EBAs actuated in an event where the engines are shut off, aircraft braking operations are powered by electric power provided by batteries, and the aircraft is moving slowly or is stopped may be selected by the customer and implemented based on customer requirements.

In various embodiments, responsive to a speed of the aircraft exceeding the predetermined speed and/or responsive to the pilot or a maintenance operator requesting braking above the predetermined percentage, the EBAC may revert to applying all EBAs associated with the aircraft regardless of the need to conserve electric power while the engines are shut off and the aircraft braking operations are electrically powered by batteries. Furthermore, responsive to typical operating power being restored because the engines are running, the EBAC may revert to applying all EBAs associated with the aircraft, when conserving power is not an issue.

Referring to FIG. 1, in accordance with various embodiments, an aircraft 10 is illustrated. The aircraft 10 includes a landing gear, which may include a left main landing gear 12, a right main landing gear 14 and a nose landing gear 16. The landing gear support the aircraft 10 when it is not flying, allowing the aircraft 10 to taxi, take off, and land without damage. While the disclosure refers to the three landing gear configurations just referred, the disclosure nevertheless contemplates any number of landing gear configurations.

Aircraft 10 may further include a brake control unit (BCU) 20 for controlling a left main brake mechanism 22 of left main landing gear 12 and a right main brake mechanism 24 of right main landing gear 14. BCU 20 controls the application of brake mechanisms 22, 24 in response to input from aircraft 10 or an authorized user. BCU 20 further controls a parking brake functionality of brake mechanisms 22, 24 to secure aircraft 10 in place. A plurality of wires that independently control the braking and parking brake functionalities run through aircraft 10 from BCU 20 to left main brake mechanism 22 and right main brake mechanism 24.

Figure 2:
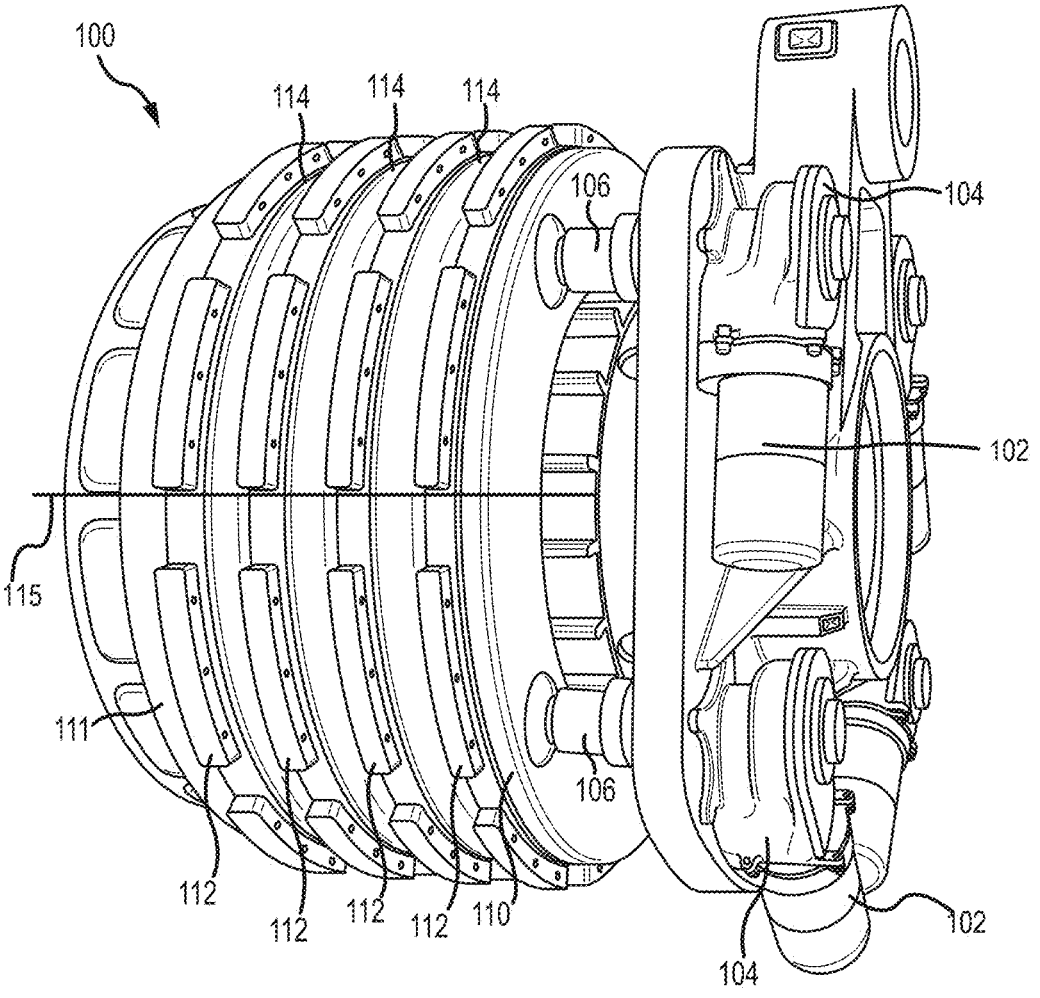
FIG. 2 illustrates an aircraft brake in accordance with various embodiments.
Figure 2:
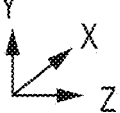

Referring to FIG. 2, an aircraft brake arrangement 100 in accordance with various embodiments is illustrated. The aircraft brake arrangement 100 may include a plurality of actuator motors 102, a plurality of electromechanical brake actuators (EBAs) 104, a plurality of ball screws 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

Figure 3:
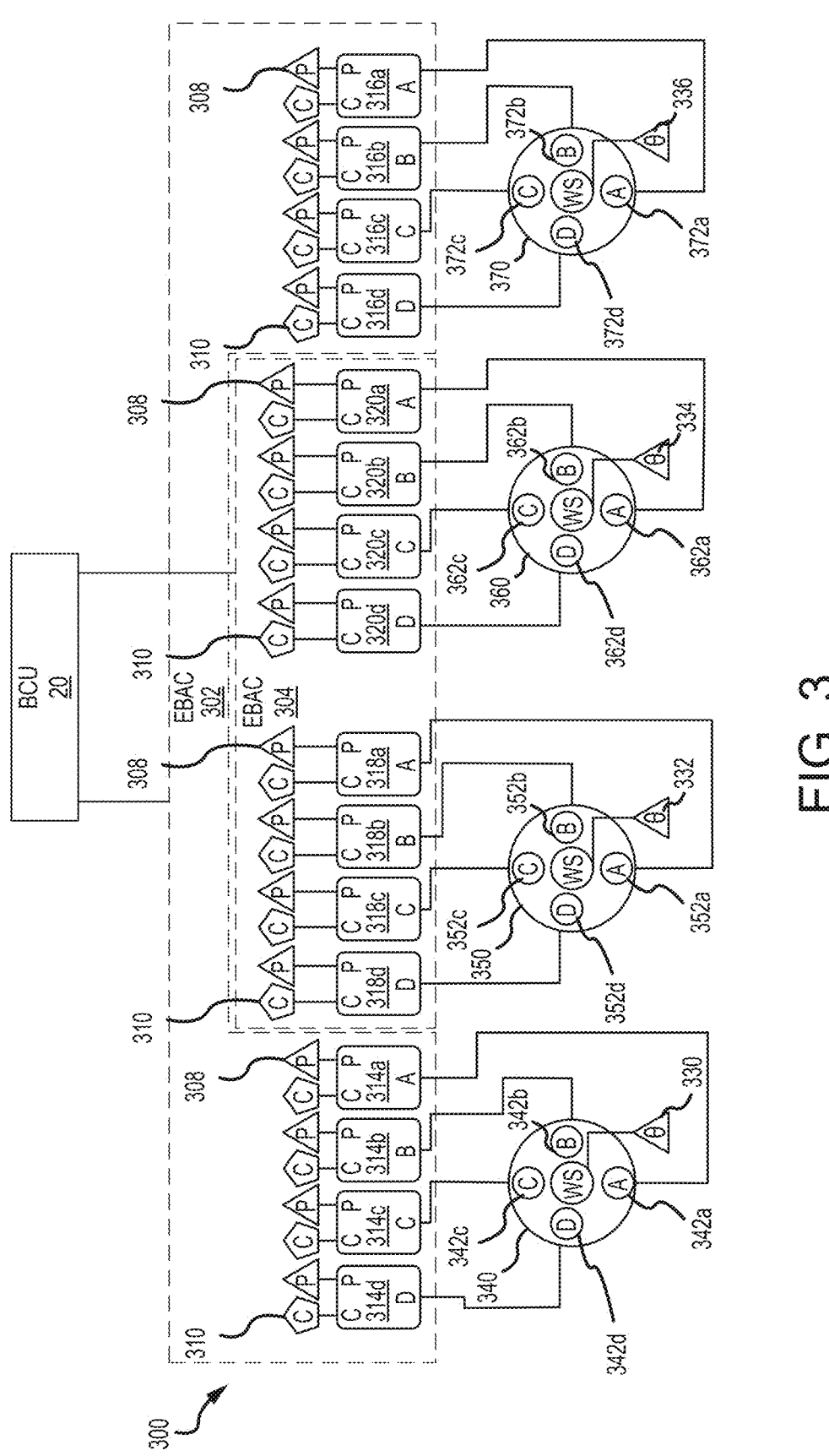
FIG. 3 illustrates a brake system for controlling multiple brakes in an aircraft brake control system, in accordance with various embodiments.

Referring now to FIG. 3, an electromechanical brake (E-brake) system 300 is illustrated, in accordance with various embodiments. While FIG. 3 illustrates the E-brake system 300 including four brakes, the illustrative embodiments are not limited to only four-brake E-brake systems. That is, in various embodiments, the brake system may be a two-brake brake system, a four-brake brake system, an eight-brake brake system, or a twelve-brake brake system, among others. E-brake system 300 includes a left outboard wheel 340, a left inboard wheel 350, a right inboard wheel 360, and a right outboard wheel 370. Each wheel 340, 350, 360, 370 includes four electric brake actuators (EBAs) labeled A, B, C, and D and a wheel speed sensor labeled WS. Each wheel speed sensor WS is electrically and logically connected to a BCU, such as BCU 20 of FIG. 1, via a wheel speed sensor connection 330, 332, 334, and 336, respectively. For example, and simplicity of discussion, left outboard wheel 340 includes a first EBA 342a, a second EBA 342b, a third EBA 342c, and a fourth EBA 342d spaced equidistance around the wheel and a wheel speed sensor WS connected to the BCU 20 by first wheel speed sensor connection 330.

E-brake system 300 further includes an outboard electronic brake actuator controller (EBAC) 302 and an inboard EBAC 304. The outboard EBAC 302 is logically and electrically connected to left outboard wheel 340 and right outboard wheel 370. The inboard EBAC 304 is logically and electrically connected to left inboard wheel 350 and right inboard wheel 360. In various embodiments, the BCU 20 controls the outboard EBAC 302 and the inboard EBAC 304. Accordingly, the outboard EBAC 302 and the inboard EBAC 304 receive force commands from the BCU 20 and the outboard EBAC 302 and the inboard EBAC 304 execute the force commands to EBAs 342a-d, 352a-d, 362a-d, and 372a-d described hereafter.

The outboard EBAC 302 includes a first actuator control 314a, a second actuator control 314b, a third actuator control 314c, and a fourth actuator control 314d. Each actuator control 314a-314d is connected to BCU 20 by first control connection 310 and receives power through first high voltage power connection 308. First actuator control 314a is configured to receive power and control data from BCU 20 and transmit the power and control data to first EBA 342a. Second actuator control 314b is configured to receive power and control data from BCU 20 and transmit the power and control data to second EBA 342b. Third actuator control 314c is configured to receive power and control data from BCU 20 and transmit the power and control data to third EBA 342c. Fourth actuator control 314d is configured to receive power and control data from BCU 20 and transmit the power and control data to fourth EBA 342d. The outboard EBAC 302 further includes actuator controls 316a-316d that are connected to BCU 20 by first control connection 310 and first high voltage power connection 308. Actuator controls 316a-316d are configured to receive power and control data from BCU 20 and transmit the power and control data to EBAs A-D, respectively, on wheel 370.

The inboard EBAC 304 includes actuator controls 318a-318d and actuator controls 320a-320d that are connected to BCU 20 by first control connection 310 and first high voltage power connection 308. Actuator controls 318a-318d are configured to receive power and control data from BCU 20 and transmit the power and control data to EBAs A-D, respectively, on wheel 350. Actuator controls 320a-320d are configured to receive power and control data from BCU 20 and transmit the power and control data to EBAs A-D, respectively, on wheel 360.

Therefore, it should be understood that the various groupings of components as described above (e.g., a, b, c, d) on each wheel work together as a unit. For example, and referring to left outboard wheel 340, first actuator control 314a and first EBA 342a work together as a unit. Second actuator control 314b and second EBA 342b work together as a unit. Third actuator control 314c and third EBA 342c work together as a unit. Fourth actuator control 314d and fourth EBA 342d work together as a unit.

In various embodiments, the E-brake system 300 may utilize selective braking of EBAs 342a-d, 352a-d, 362a-d, and 372a-d during ground operations, where the engines are shut off, aircraft braking operations are electric power provided by batteries, and the aircraft is either moving slowly, i.e. below a predetermined speed, for example 10 knots, or the aircraft is stopped and parking brakes are employed, braking levels requested by a pilot or maintenance operator, among others, are low, in a range of a total capacity of the brake system less than or equal to a predetermined percentage of the total capacity. In various embodiments, the range of total capacity may be less than or equal to 30%. In various embodiments, the range of total capacity may be between greater than 5% and less than or equal to 30%.

In various embodiments, responsive to the requested braking level being less than or equal to a predetermined percentage of the total capacity, a number of the EBAs 342a-d, 352a-d, 362a-d, and 372a-d actuated to execute the braking event may be less than a total number of the EBAs 342a-d, 352a-d, 362a-d, and 372a-d associated with each wheel 340, 350, 360, and 370, respectively, of the aircraft. In that regard, in various embodiments, in case of a 4-wheel aircraft as illustrated in FIG. 3, a number of the EBAs 342a-d, 352a-d, 362a-d, and 372a-d actuated to execute the braking event may be one EBA per wheel 340, 350, 360, and 370. In various embodiments, in the case of a 4-wheel aircraft, a number of the EBAs 342a-d, 352a-d, 362a-d, and 372a-d actuated to execute the braking event may be two EBAs per wheel. In various embodiments, in the case of a 4-wheel aircraft, a number of EBAs actuated to execute the braking event may be three EBAs per wheel, such as EBAs 342a-c, 352a-c, 362a-c, and 372a-c. In various embodiments, when two EBAs are actuated, the EBAs actuated may be opposite each other, such as EBAs 342a and 342c, 352a and 352c, 362a and 362c, and 372a and 372c. In various embodiments, when two EBAs are actuated, the EBAs actuated may be adjacent to one another, such as EBAs 342a and 342d, 352a and 352d, 362a and 362d, and 372a and 372d. In that regard, in various embodiments, in the case of a 4-wheel aircraft, the BCU 20 may select 1, 2, or 3 of the EBAs during a first braking event and, during a subsequent braking event, select a different set of 1, 2, or 3 EBAs in order to improve EBA reliability. Therefore, as an example, in the case of a 4-wheel aircraft, during a first braking event, the BCU 20 may select EBAs 342a and 342c, 352a and 352c, 362a and 362c, and 372a and 372c that are opposite one another and, during a subsequent braking event, select EBAs 342b and 342d, 352b and 352d, 362b and 362d, and 372b and 372d that are opposite one another to improve EBA reliability. Accordingly, in various embodiments, a net effect is that the EBA's are only actuated half the time, increasing their reliability.

In various embodiments, responsive to a pilot or a maintenance operator requesting 20% braking, the BCU 20 may determine that the full 20% braking is not needed due to the current speed of the aircraft or historical braking operations, among other considerations. In that regard, in an event where the engines are shut off, aircraft braking operations are powered by electric power provided by batteries, the aircraft is moving slowly or is stopped, and the pilot or maintenance operator or BCU 20 requests 20% braking, the BCU 20 may send a command to EBACs 302, 304 that causes EBACs 302, 304 to initially apply a predetermined percentage of the requested braking percentage, which provides additional control of the brakes at the lower levels of brake application and decreases the electrical power needed to be drawn from the batteries.

In various embodiments, in an event where the engines are shut off, aircraft braking operations are electric power provided by batteries, the aircraft is moving slowly or is stopped, and the pilot or maintenance operator requests 20% braking force, since the number of the EBAs 342a-d, 352a-d, 362a-d, and 372a-d actuated to execute the braking event is less than a total number of the EBAs 342a-d, 352a-d, 362a-d, and 372a-d associated with each wheel of the aircraft, the EBACs 302, 304, via a command from the BCU 20, may increase a braking force applied by the selected ones of the EBAs 342a-d, 352a-d, 362a-d, and 372a-d in order to quantitatively meet the 20% braking force that would typically be applied by all of the EBAs 342a-d, 352a-d, 362a-d, and 372a-d. In that regard, where typically, in a four EBA per wheel system, 20% braking force would be applied by each of the EBAs 342a-d, 352a-d, 362a-d, and 372a-d, in various embodiments, when only two EBAs per wheel are utilized, e.g. EBAs 342b and 342d, 352b and 352d, 362b and 362d, and 372b and 372d, the EBACs 302, 304, via a command from the BCU 20, may increase the braking force applied by each of the EBAs 342b and 342d, 352b and 352d, 362b and 362d, and 372b and 372d above the requested 20% braking force by between 50% and 100%, i.e. such that the braking force applied by each of the EBAs 342b and 342d, 352b and 352d, 362b and 362d, and 372b and 372d is greater than the requested braking force. In various embodiments, the requested braking force applied by the reduced number of EBA may be increased by between 10% and 100%. In various embodiments, the requested braking force applied by the reduced number of EBA may be increased by between 25% and 100%. In various embodiments, the requested braking force applied by the reduced number of EBA may be increased by between 50% and 100%. In various embodiments, the requested braking force applied by the reduced number of EBA may be increased by between 75% and 100%. Accordingly, in various embodiments, the EBAs are utilized less thereby providing better reliability and power may be reduced unless the braking force is increased by 100%.

In various embodiments, the number of the EBAs 342a-c, 352a-c, 362a-c, and 372a-c actuated in an event where the engines are shut off, aircraft braking operations are powered by electric power provided by batteries, and the aircraft is moving slowly or is stopped, may be predefined by the customer and implemented by the BCU 20 based on customer requirements.

In various embodiments, responsive to a speed of the aircraft exceeding the predetermined speed as determined by the associated wheel speed sensor via the wheel speed sensor connection 330, 332, 334, and/or 336 and/or responsive to the pilot or a maintenance operator requesting braking above the predetermined percentage, the BCU 20 may revert to applying all of the EBAs 342a-c, 352a-c, 362a-c, and 372a-c associated with the aircraft regardless of the need to conserve electric power while the engines are shut off and the aircraft braking operations are electrically powered by batteries. Furthermore, responsive to normal power being restored because the engines are running, the BCU 20 may revert to applying all of the EBAs 342a-c, 352a-c, 362a-c, and 372a-c associated with the aircraft EBAs 342a-c, 352a-c, 362a-c, and 372a-c.

Referring now to FIG. 4, in accordance with various embodiments, a method 400 for selective braking of electromechanical brake actuators (EBAs) within an electromechanical brake (E-brake) system is illustrated. The method 400 may be performed by the EBACs 302, 304, via a command from the BCU 20, as described above, with respect to FIG. 3. At block 402, the EBAC identifies that engines of the aircraft are shut off, aircraft braking operations are only using electric power provided by batteries, and the aircraft is either moving slowly, the aircraft is stopped, or parking brakes of the aircraft are employed. At block 404, the EBAC determines whether a braking force request has been received. If at block 404 a braking force request has not been received, the operation returns to block 404. If at block 404 a braking force request has been received, at block 406, the EBAC determines whether the requested braking force is above a predetermined percentage of a total amount of braking available. If at block 406 the requested braking force is above the predetermined percentage of the total amount of braking available, at block 408, the EBAC applies the requested braking force to all EBAs associated with each wheel of the aircraft. If at block 406 the requested braking force is at or below the predetermined percentage of the total amount of braking available, at block 408, the EBAC selectively controls a number of EBAs less than a total number of EBAs associated with each wheel of the aircraft as well as an amount of braking force applied by each of the selectively controlled EBAs, as described previously.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical brake system, the electromechanical brake system comprising:

at least two electromechanical brake actuators; and an electronic brake actuator controller, the electronic brake actuator controller coupled to the at least two electromechanical brake actuators, wherein, responsive to receiving a requested braking force, the electronic brake actuator controller is configured to:

determine whether the requested braking force is above a predetermined percentage of a total amount of braking available; and responsive to the requested braking force being at or below the predetermined percentage of the total amount of braking available:

selectively control only one electromechanical brake actuator of the at least two electromechanical brake actuators while the other electromechanical brake actuator of the at least two electromechanical brake actuators remain unactuated; and selectively control an amount of braking force applied by the only one electromechanical brake actuator.

2. The electromechanical brake system of claim 1, the electronic brake actuator controller is further configured to:

responsive to the requested braking force being above the predetermined percentage of the total amount of braking available, control the at least two electromechanical brake actuators to each apply the requested braking force.

3. The electromechanical brake system of claim 1, wherein the amount of braking force applied by the only one electromechanical brake actuator is greater than the requested braking force.

4. The electromechanical brake system of claim 3, wherein the amount of braking force applied by the only one electromechanical brake actuator is between 10 percent and 100 percent more than the requested braking force.

5. The electromechanical brake system of claim 1, wherein the at least two electromechanical brake actuators are at least four electromechanical brake actuators spaced equidistance around a wheel, wherein the electronic brake actuator controller is configured to:

responsive to the requested braking force being at or below the predetermined percentage of the total amount of braking available:

selectively control two or more electromechanical brake actuators of the at least four electromechanical brake actuators, wherein at least two of the two or more electromechanical brake actuators are opposite one another.

6. The electromechanical brake system of claim 1, wherein the at least two electromechanical brake actuators are at least four electromechanical brake actuators spaced equidistance around a wheel, wherein the electronic brake actuator controller is configured to:

responsive to the requested braking force being at or below the predetermined percentage of the total amount of braking available:

selectively control two or more electromechanical brake actuators of the at least four electromechanical brake actuators, wherein at least two of the two or more electromechanical brake actuators are adjacent to one another.

7. The electromechanical brake system of claim 1, wherein the electronic brake actuator controller is configured to selectively control the only one electromechanical brake actuator of the at least two electromechanical brake actuators and selectively control the amount of braking force applied by the only one electromechanical brake actuator in response to engines of an aircraft in which the electromechanical brake system is installed are shut off, aircraft braking operations are provided by batteries, and the aircraft is either moving slowly or is stopped.

8. The electromechanical brake system of claim 1, wherein the electronic brake actuator controller is configured to selectively control the only one electromechanical brake actuator of the at least two electromechanical brake actuators and selectively control the amount of braking force applied by the only one electromechanical brake actuator in response to engines of an aircraft in which the electromechanical brake system is installed are shut off, aircraft braking operations are provided by batteries, and a parking brake of the aircraft is employed.

9. An aircraft, the aircraft comprising:

an electromechanical brake system, the electromechanical brake system comprising:

at least two electromechanical brake actuators; and an electronic brake actuator controller, the electronic brake actuator controller coupled to the at least two electromechanical brake actuators, wherein, responsive to receiving a requested braking force, the electronic brake actuator controller is configured to:

determine whether the requested braking force is above a predetermined percentage of a total amount of braking available; and responsive to the requested braking force being at or below the predetermined percentage of the total amount of braking available:

selectively control only one electromechanical brake actuator of the at least two electromechanical brake actuators while the other electromechanical brake actuator of the at least two electromechanical brake actuators remain unactuated; and selectively control an amount of braking force applied by the only one electromechanical brake actuator.

10. The aircraft of claim 9, the electronic brake actuator controller is further configured to:

responsive to the requested braking force being above the predetermined percentage of the total amount of braking available, control the at least two electromechanical brake actuators to each apply the requested braking force.

11. The aircraft of claim 9, wherein the amount of braking force applied by the only one electromechanical brake actuator is greater than the requested braking force.

12. The aircraft of claim 11, wherein the amount of braking force applied by the only one electromechanical brake actuator is between 10 percent and 100 percent more than the requested braking force.

13. The aircraft of claim 9, wherein the at least two electromechanical brake actuators are at least four electromechanical brake actuators spaced equidistance around a wheel, wherein the electronic brake actuator controller is configured to:

responsive to the requested braking force being at or below the predetermined percentage of the total amount of braking available:

selectively control two or more electromechanical brake actuators of the at least four electromechanical brake actuators, wherein at least two of the two or more electromechanical brake actuators are opposite one another.

14. The aircraft of claim 9, wherein the at least two electromechanical brake actuators are at least four electromechanical brake actuators spaced equidistance around a wheel, wherein the electronic brake actuator controller is configured to:

responsive to the requested braking force being at or below the predetermined percentage of the total amount of braking available:

selectively control two or more electromechanical brake actuators of the at least four electromechanical brake actuators, wherein at least two of the two or more electromechanical brake actuators are adjacent to one another.

15. The aircraft of claim 9, wherein the electronic brake actuator controller is configured to selectively control the only one electromechanical brake actuator of the at least two electromechanical brake actuators and selectively control the amount of braking force applied by the only one electromechanical brake actuator in response to engines of the aircraft in which the electromechanical brake system is installed are shut off, aircraft braking operations are provided by batteries, and the aircraft is either moving slowly or is stopped.

16. The aircraft of claim 9, wherein the electronic brake actuator controller is configured to selectively control the only one electromechanical brake actuator of the at least two electromechanical brake actuators and selectively control the amount of braking force applied by the only one electromechanical brake actuator in response to engines of the aircraft in which the electromechanical brake system is installed are shut off, aircraft braking operations are provided by batteries, and a parking brake of the aircraft is employed.

17. A method of controlling at least two electromechanical brake actuators of a brake assembly comprising:

responsive to receiving a request to apply a requested braking force to the brake assembly, determining, by an electronic brake actuator controller, whether the requested braking force is above a predetermined percentage of a total amount of braking available; and responsive to the requested braking force being at or below the predetermined percentage of the total amount of braking available:

selectively controlling, by the electronic brake actuator controller, only one electromechanical brake actuator of the at least two electromechanical brake actuators while the other electromechanical brake actuator of the at least two electromechanical brake actuators remain unactuated; and selectively controlling, by the electronic brake actuator controller, an amount of braking force applied by the only one electromechanical brake actuator.

18. The method of claim 17, further comprising:

responsive to the requested braking force being above the predetermined percentage of the total amount of braking available, controlling, by the electronic brake actuator controller, the at least two electromechanical brake actuators to each apply the requested braking force.

19. The method of claim 17, wherein the amount of braking force applied by the only one electromechanical brake actuator is greater than the requested braking force.

20. The method of claim 19, wherein the amount of braking force applied by the only one electromechanical brake actuator is between 10 percent and 100 percent more than the requested braking force.

* * * * *